United States Patent Office 3,537,987
Patented Nov. 3, 1970

3,537,987
METHOD OF FILTERING MOLTEN LIGHT METALS
Arthur J. Copeland, Bellingham, Wash., assignor to Intalco Aluminum Corporation, Ferndale, Wash., a corporation of Delaware
Filed Aug. 28, 1969, Ser. No. 853,880
Int. Cl. B01d 23/14
U.S. Cl. 210—20
5 Claims

ABSTRACT OF THE DISCLOSURE

Molten light metal, such as aluminous metal, is cleaned of finely divided non-metallic solids by causing the molten metal to flow through a container having communicating upstream and downstream compartments with a floating filter bed of carbon granules in the downstream compartment by means of which bed the solids are removed. Preferably, the container also has means for removing entrained hydrogen gas.

---

Figure 1:
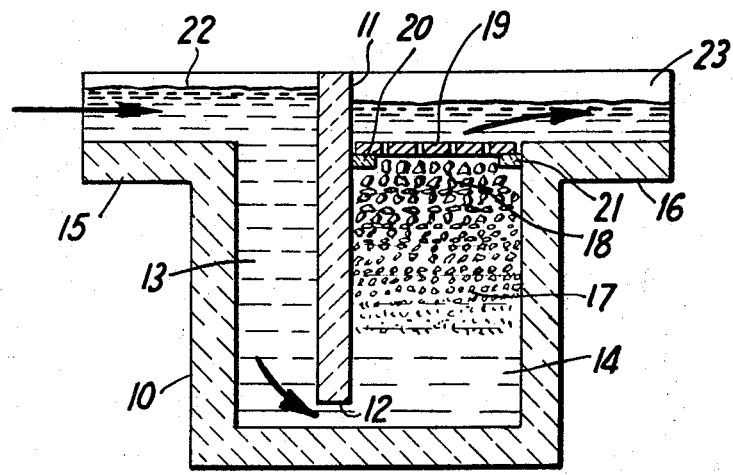

This invention relates to the filtering of light metals and, more particularly, to a method for filtering and degassing aluminous metals, whereby to remove finely divided non-metallic particles entrapped therein and entrained gases, for example, hydrogen.

The term "light metals" employed herein is meant to cover those metals having densities greater than carbon but not exceeding about 5 grs./cm.$^3$, while the term "aluminous metals" is meant to cover aluminum and aluminum-base alloys, the alloys being those generally containing at least about 50% aluminum and having densities greater than carbon.

THE STATE OF THE ART AND THE PROBLEM

In the melting of aluminous metal and the casting thereof into ingots or billets, it is known that the solidified metal may contain a dispersion of non-metallic particles, such as aluminum oxide, throughout its matrix, unless special precautions are taken. This arises because when aluminous metal is molten, a film of oxide generally forms on the surface and, through agitation of the melt, such as by stirring and the like, the film is broken up into particles which become entrapped in the metal. Temperature changes of the melt may change the relative densities of the oxides and the molten aluminum; this may cause some oxides to remain suspended in the melt. Under certain conditions, magnesium oxide, refractory material, cryolite, and the like, may become entrapped in the melt. Because these particles remain as inclusions in the final product, they tend to have an adverse effect on its physical properties.

In addition to solid particles, gas may be frequently entrapped, occluded, or dissolved within molten aluminous metal. A common gas normally found in aluminous metals is hydrogen which may find its way into molten metal by reaction of the metal with moisture in the surrounding environment. The hydrogen may be present in small voids in the solid metal product or dissolved interstitially in the metal such that when the metal is subjected to hot working, metallurgical defects in the form of flakes, blisters, slivers, and the like, are apt to occur in sufficient amounts to cause rejection of the final product.

In the case of solid non-metallic particles, methods have been proposed for filtering them from the molten bath by passing the molten metal through a porous body or through a filter bed of predetermined thickness composed of a packing of refractory granules, such as tabular alumina. As illustrative of some of the proposed methods, reference is made to U.S. Pat. Nos. 2,863,558, 3,006,473, 3,010,712, 3,025,155 and 3,039,864.

Several of the methods proposed involved using a refractory chamber partitioned by a baffle so as to divide the chamber into upstream and downstream compartments, with the upstream compartment, for example, having a bed of tabular alumina resting on the bottom and extending upwards in the compartment, the coarser particles being disposed at the bottom where the molten metal flows beneath the baffle. Thus, as molten metal is caused to flow into the upstream compartment, it passes down through the filter bed, beneath the free end of the baffle plate and out through the downstream compartment. The non-metallic particles in the bath are filtered out by the bed. While such methods have been helpful in cleaning up the metal, they have certain inherent disadvantages in that, as the filter bed clogs, it must be replaced which may result in extended downtime periods, since generally, the chamber must be removed in order to empty it and recharge it with a new filter bed.

With regard to removing occluded or dissolved gases, a method proposed (note U.S. Pats Nos. 2,811,346, 2,871,008 and 2,947,527) is to flux the molten metal with a gas, such as argon, nitrogen, or other inert gases by insufflating the gas into the mass of molten metal by blowing the cleansing gas into the melt through a porous plug of refractory material, e.g., alumina, snugly fitted into an opening in the bottom of the container or ladle of molten metal. Thus, by converting the gas stream into finely divided gas bubbles, a fairly good removal of hydrogen is obtained. In U.S. Pat. No. 3,025,155, a method is disclosed for using chlorine to remove impurities, such as sodium and magnesium, by feeding chlorine into the aluminum melt from above through a porous tube. A disadvantage of using chlorine as a cleansing gas through a porous plug in the bottom of the container is that the refractory material of the plug (for example, alumina) is generally attacked and rendered useless after a relatively short period of use.

I have found that I can overcome the foregoing difficulties by providing an improved filtering method by means of which filtering may be conducted efficiently, rapidly and with reduced material costs and, moreover, by means of which filtering can be sustained in the production line with very little downtime. I have also found that by modifying the gas cleansing treatment and using it in combination with the improved filtering method, entrained gas can be efficiently removed simultaneously with the removal of nonmetallic particles, particularly by using chlorine as the cleansing gas.

It is thus the object of the invention to provide a rapid, efficient and low cost method for cleaning molten light metal by filtration, such as molten aluminous metal.

Another object is to provide a method whereby non-metallic particles may be removed efficiently from molten aluminous metal together with entrained gases, such as hydrogen.

A still further object is to provide a method and apparatus in which both the filtering and the degassing can be carried simultaneously in the same filter box.

Figure 2:
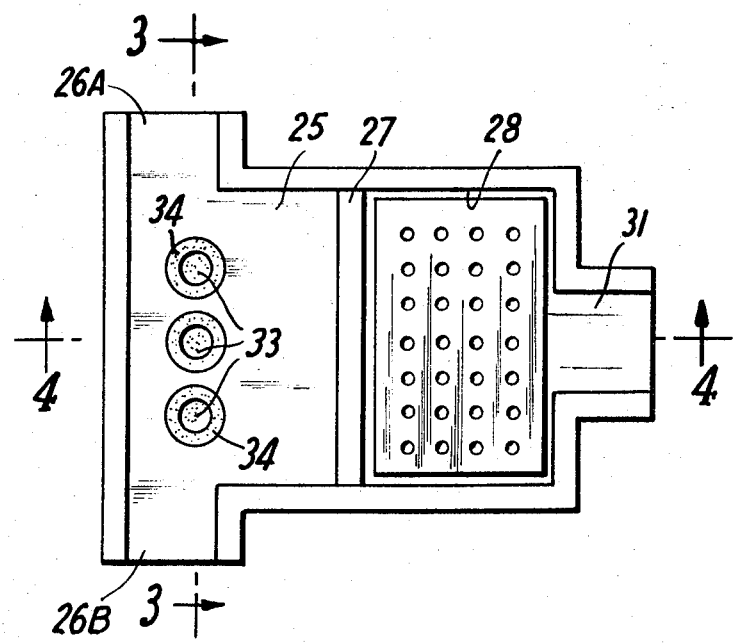
Figure 4:
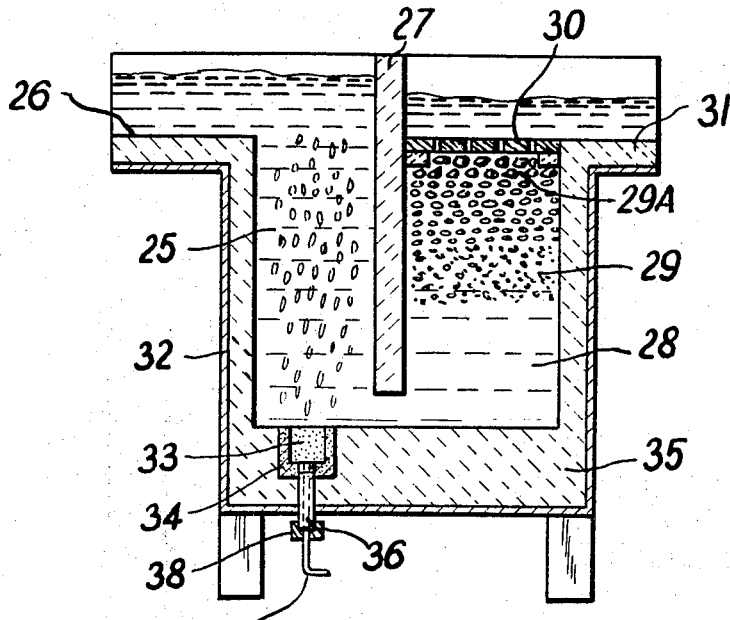
Figure 3:
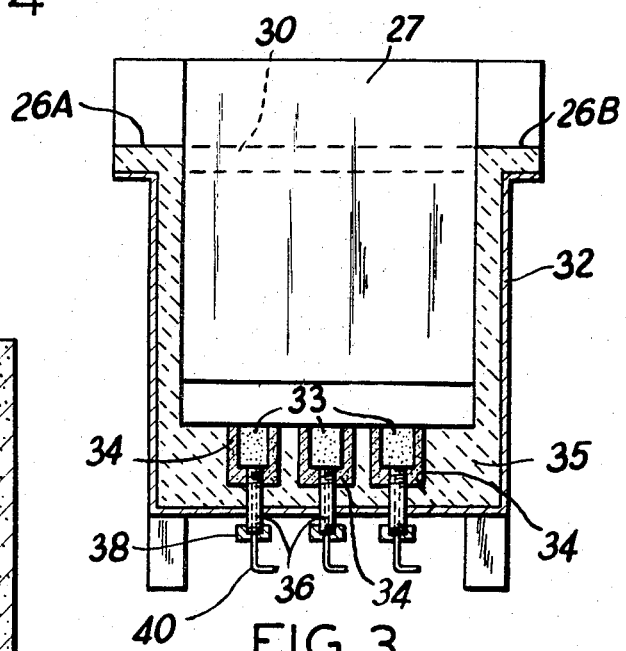
Figure 5:
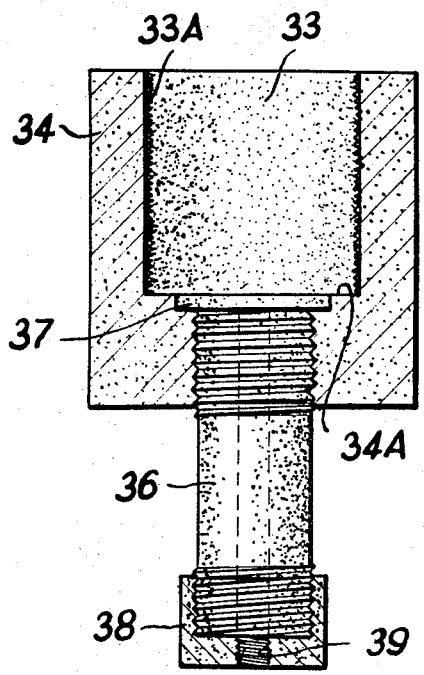

These and other objects will more clearly appear from the following description and the accompanying drawings, wherein:

FIG. 1 is illustrative of one embodiment of a filter apparatus which may be used in carrying out the novel method of the invention;

FIGS. 2, 3 and 4 are illustrative of another embodiment of an apparatus provided by the invention for carrying out both the filtering and gas cleaning treatments of molten light metal in a single filter box, FIGS. 3 and 4 being sections taken along lines 3—3 and 4—4 of FIG. 2, respectively; and FIG. 5 depicts in cross section one embodiment of a porous plug which may be employed to remove entrained or dissolved gas from molten light metal.

GENERAL DISCLOSURE OF THE INVENTION

The broad aspects of the invention reside in a method for filtering molten light metals, in particular aluminous metal, to remove finely divided solids therefrom while the molten metal is caused to flow through a container having an upstream compartment communicating with and separated from a downstream compartment by a transverse baffle and, during which flow, the solids are removed. The improvement provided by the invention resides in maintaining a floating filter bed of relatively coarse carbon granules in the downstream compartment in an amount sufficient to provide a filter bed which will effectively filter the molten metal, for example, a bed of at least about 8 inches thick so that, as the molten metal is continuously fed into the container at the upstream compartment side thereof, it passes under the baffle and up through the filter bed where the finely divided non-metallic solids are removed.

A preferred embodiment is to locate the floating filter bed in the downstream compartment while using the upstream compartment for degassing. To carry out the degassing, plugs are located snugly in a connecting opening in the bottom of the upstream compartment and cleansing gas, e.g., a mixture of nitrogen and chlorine, blown into and upward through the molten metal. Thus, entrained gas (e.g., hydrogen) can be removed substantially simultaneously with the removal by filtering of finely divided solids. An advantage of the invention is that the carbon filter material is cheaper than, for example, tabular alumina which is a commonly used filter material.

A further advantage of using carbon is that it may be obtained by crushing carbon anodes previously used in the aluminum reduction process. Thus, the economics as to the filter material are particularly attractive.

A still further advantage is the ease of handling of the filter assembly. Should it be necessary, for any reason, to change the filter material, the container need not be dissembled from the metal transfer troughs. The carbon granules can be removed from the top of the bath during a very brief holding period, and a fresh filter bed of carbon applied. As will be appreciated, because of the simplicity of the container assembly, it can be designed and insulated so that no supplemental heat is required during casting. During prolonged hold-over periods, the heat in the container of molten metal can be maintained by simply placing an insulated cover on the unit and employing a portable gas torch. Thus, the expensive installation of supplemental built in heat sources is avoided.

Because the filter bed floats, one compartment may be used for filtering the metal while the other may carry out the degassing treatment. In this connection, it has been found that by using a porous plug of carbon encased in a sleeve of graphite, the corrosive effect of chlorine-containing cleansing gases on the materials of construction of the plug can be avoided.

DETAILED DESCRIPTION OF THE INVENTION

As stated hereinabove, by using crushed baked carbon anodes as the source of filter material, considerable cost savings can be effected. The carbon granules used are relatively coarse and may range in size in the floating filter bed from about 3/16″ to about 5/8″, the bed being advantageously covered by a hold-down layer of larger particle size ranging from about 1/2″ to about 1″. Beds of the foregoing particle sizes have removed finely divided solids of sizes down to 0.001″. As illustrative of one embodiment of the invention, reference is made to FIG. 1 which depicts an insulated container or filter box of substantially inert material, found suitable in carrying out the method. The chamber 10 is partitioned by a transverse baffle 11, the free end 12 extending to but not touching the bottom so as to provide upstream and downstream compartments 13 and 14, respectively, which communicate with each other. The upstream compartment is connected to an upstream trough 15, while the downstream compartment is connected to a downstream trough 16 so as to provide metal flow, as shown by the arrows, from trough 15 down through upstream compartment 13, beneath baffle 11, up through downstream compartment 14 and out through trough 16. A floating filter bed of coarse carbon granules 17 is located in the downstream compartment 14, the top of the bed having a hold-down layer of coarser carbon granules 18, said layer being covered by a perforated retaining plate 19 of, preferably, graphite, although the plate may be made of heat resistant cast iron. Where perforated cast iron is used as the retainer plate, it may be necessary to support the plate on lugs or shoulders extending from the side walls of the container and the baffle as shown by plate-holding lugs 20, 21.

The filter bed proper 17, which does the filtering advantageously, ranges in thickness from about 8 inches to 12 inches, with the particle size ranging from about 3/16 inch to about 5/8 inch. The coarse layer 18 of carbon granules advantageously ranges in thickness from about 1/2 inch to about 1 inch. The retainer plate may be about 1 inch to 1 1/2 inches thick. The perforation may be holes of about 1/2 inch separated by 2 inch centers.

When molten metal is poured via trough 15 into the container of FIG. 1 and after the floating filter bed has been assembled and established, the molten bath of aluminous metal passes through compartment 13; then unobstructively and freely beneath the free end 12 of baffle plate 11, upwards through downstream compartment 14, through filter bed 17 where the solids are filtered out, through the coarse layer of carbon granules 18, through the perforations of plate 19, and out through trough 16. After a substantial steady state has been achieved, a head of metal develops which is the difference in height between the upstream level 22 of molten metal and the downstream level 23. The head of metal may range from about 1/2 inch to 1 1/2 inches. As will be apparent, when a head of molten metal is maintained, a strong, positive, unobstructed flow of metal is assured at the bottom of the container due to a siphoning action, whereby the molten metal is drawn positively upwardly through the filter bed.

Tests were run with the embodiment of FIG. 1. This design was particularly chosen as it lent itself to subsequent work on degassing. The filter bed was comprised of particle size of about minus one-half inch plus one-quarter inch, the depth being about 11 inches with the hold-down plate located as shown in FIG. 1. At a temperature of 1335° F. to 1340° F., a flow rate of 20,000 lbs./hr. was achieved in casting 6 inch billets with a metal head difference (the head difference of the metal flowing through the upstream and downstream compartments) of about one-half to three-quarters of an inch. In a test run at 1335° F. in which the filter bed had a depth of about 12 to 14 inches, the head of metal ranged from about one-half to one inch for a flow rate of 20,000 lbs./hr. of molten metal when casting 6 inch billets. Except for the initial preheating of the container and providing heat during prolonged shutdown periods, it was not necessary to employ auxiliary heating during the casting runs. The nominal composition of the aluminous metal was 0.4% silicon, 0.2% iron, 0.5% magnesium, 0.02% titanium and the balance aluminum.

FIGS. 2 to 4 depict a preferred apparatus embodiment which may be employed in carrying out the novel method of the invention, including degassing of molten aluminous metal in the same filter box or container. Referring to FIGS. 2 and 4, the degassing is carried out in upstream compartment 25, the molten aluminous metal flowing into compartment 25 by way of upstream troughs 26A, 26B, beneath transverse baffle plate 27 into downstream compartment 28, up through filter bed 29, through the layer of coarse carbon granules 29A and retainer plate 30, and out through downstream trough 31. The container, which has a liner constructed of castable refractory, is covered by a metal sheathing 32 of three-eighths inch steel plate. The bottom wall of the container is of sufficient thickness to provide support for several porous plugs of carbon through which cleansing gas is blown into the upstream compartment.

Referring to FIGS. 2 to 5, the porous plugs 33 of circular shape are shown snugly fitted within circular cups of graphite 34, each cup having an annular shoulder 34A at the bottom thereof to support the plugs therein. Each of the graphite cups is embedded in an opening in lining 35 of the bottom wall, a hollow graphite nipple 36 being screw fitted within a through opening in the bottom of the cup (note FIG. 5). A gas distributing space 37 is provided by way of the annular shoulders 34A between the porous plug and the hollow nipple to distribute the incoming cleansing gas along the bottom of the porous plug. A screw cap 38 is provided at the opposite end of the nipple having a threaded central opening 39 for receiving a gas conducting tube 40 (note FIG. 3) in threading engagement therewith. All of the contacting surfaces between the porous carbon plugs and the graphite sleeves are coated with a carbonaceous cement 33A (FIG. 5), the plug assemblies being baked for one hour at 1500° F. so as to cure the cement.

The combination porous carbon plug 33 and graphite holding cup 34 is advantageous when a chlorine-containing cleansing gas is employed in the degassing process in that the materials resist the corrosive attack of chlorine. By having the porous cup surrounded by solid graphite, lateral diffusion of the gas into the lining in inhibited and the gas directed upwardly through the molten bath of metal in finely disseminated bubbles (note FIG. 4).

In an initial test using a chlorine-containing cleansing gas passing through a porous refractory plug encased in a steel sleeve, the steel sleeve was practically completely disintegrated and the porous refractory plug severely attacked. On the other hand, porous carbon plugs gave excellent results when chlorine-containing gas was used.

It has been observed that there is a relationship between the removal of the hydrogen gas from molten aluminum and the removal of deleterious suspended particles such as oxides. This appears to be particularly true when chlorine is used as the degassing agent or is used as a mixture with nitrogen.

It is believed that atoms of hydrogen, which are present as water vapor in the surrounding atmosphere, diffuse into the melt as nascent hydrogen. These atoms apparently utilize the suspended solid particles to form molecules of hydrogen which become loosely attached to the particles. The inert gases, such as nitrogen and argon, will generally remove a large percentage of the hydrogen from the melt but do not substantially influence the removal of the particles. However, the presence of chlorine in the injected gas causes a chemical reaction with the hydrogen to form hydrochloric acid and with the aluminum to form aluminum chloride, and these chemical reactions are believed to be instrumental in the further removal of the finely divided solids along with the entrained hydrogen.

These hypotheses were confirmed by a series of tests wherein nitrogen alone and argon alone were used and wherein the inert gases were injected into the molten aluminum through the porous carbon plugs in the upstream filter compartment at a rate of about 120 cubic feet per minute, the floating filter bed in the downstream compartment being about ten inches thick. The results indicated that, by comparison, chlorine was markedly efficient in effecting both the removal of hydrogen and the particles; whereas, with the inert gases, the filter bed tended to plug or clog sooner, thus indicating that particle removal was not as efficient.

Large scale tests, in which the cleansing gas comprised 80% nitrogen and 20% chlorine, showed in one instance that about six times more metal could be filtered before the filter bed became plugged (250,000 lbs. of metal with the chlorine-containing gas, as against 40,000 lbs. of metal with either nitrogen or argon). In another large scale test, as much as 15 times more metal could be filtered before the filter became plugged using the chlorine-containing gas.

While, broadly speaking, benefits are achieved using the floating filter bed per se, I have found it very advantageous in consistently achieving optimum results to use both the floating bed and the chlorine treatment step together simultaneously in the same container or filter box, or other single filter unit.

In commercial practice, using the more conventional filtering techniques, the method generally employed is to use a separate unit for filtering and one for degassing. This increases cost, requires the use of critical floor space, and generally requires the use of additional auxiliary heating equipment in light of the separate handling of the molten metal by the two units.

The large scale tests corroborate that chlorine greatly assists in the removal of the suspended particles from the molten metal prior to its passing through the filter bed. It is, therefore, particularly advantageous to use materials such as porous carbon and graphite for injecting the gas mixture, as these materials are not subjected to chemical attack by chlorine at the 1300° F. to 1360° F. operating temperatures. The use of the porous carbon degassing plug, which withstands the corrosive attack of chlorine, is an advantageous adjunct in carrying out the preferred embodiments of the invention.

Large scale tests as indicated above were conducted using the embodiment of FIGS. 2 to 4 and using substantially the same particle size distribution of crushed carbon anodes, the size of minus one-half inch and plus three-sixteenths inch being used as the standard filter bed materal. As illustrative of the invention, the following example is given.

An aluminum alloy having the composition 0.37% silicon, 0.18% iron, 0.51% magnesium and 0.015% titanium and the balance substantially aluminum was batched in a furnace and the molten metal degassed and filtered in accordance with the invention prior to casting it into 7 inch billets at a rate of 25,000 lbs./hour.

In one test in which 12 casts of 24 6" diameter billets per cast, about 300,000 pounds were produced, a nitrogen-chlorine cleansing gas containing about 75% $N_2$ and about 25% $Cl_2$ was blown into the molten bath in the upstream compartment shown in FIG. 4 at a rate of about 110 cubic feet per hour of gas mixture and the degassed metal caused to flow through a filter bed of crushed carbon anodes of about 10 inches in depth. The upstream metal, prior to degassing, had an average gas emission reading of about 35 when 100 ml. samples were solidified under vacuum of 10 mm. while the downstream metal, after degassing and filtering, indicated an average gas emission reading of about 2 when 100 ml. samples were solidified under the 10 mm. of vacuum. In other words, the degassing was 94.3% effective in removing entrained hydrogen.

In another test in which 8 casts of 24 ingots per cast of 6" diameter billets were produced, a nitrogen-chlorine cleaning gas containing about 80% $N_2$ and about 20% $Cl_2$ was blown into the molten bath in the upstream compartment at a gas flow rate of about 130 cubic feet per hour. The average gas content of the upstream metal prior to degassing was a reading of 80 taken under a 10 mm. vacuum, while the downstream metal averaged 1 emission, resulting in an effective gas removal of about 96.7%.

In a still another test in which 14 casts of 7 inch diameter billets were produced, a gas mixture of about 80% $N_2$ and about 20% $Cl_2$ was employed blown into the metal at a rate of 110 cubic feet per hour. The gas removed was 93.6% effective.

In carrying out the large scale tests, 6", 7", 8" and 9" diameter billets were produced. The results of these tests showed that high quality, high density ingots can be produced low in occluded gas and low in inclusion count.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. In a method for treating molten light metal for removing dissolved gases and finely divided solids therefrom, wherein the molten metal is passed through a container having an upstream compartment communicating with and separated from a downstream compartment by a baffle which extends to but terminates above the bottom of the container, the improvement which comprises, maintaining a floating filter bed of carbon granules in said downstream compartment in an amount sufficient to filter said molten metal, feeding said molten metal into the upstream compartment and causing it to flow from said upstream compartment to and through said downstream compartment while passing through said downstream floating filter bed of carbon, and insufflating chlorine-containing cleansing gas into and through said molten metal while it is flowing through the upstream compartment of said container by passing said cleansing gas through a porous carbon plug snugly encased within a solid graphite sleeve embedded in an opening in the bottom wall of said upstream compartment.

2. The method of claim 1, wherein the chlorine-containing cleansing gas is a blend of nitrogen and chlorine.

3. The method of claim 1, wherein the molten metal is caused to flow through said floating filter bed of thickness of at least about 8 inches.

4. The method of claim 1, wherein the floating bed of carbon granules is at least about 8 inches thick and is comprised of a hold-down top layer of average particle size ranging from about one-half inch to about 1 inch, and wherein the carbon granules of the remainder of the filter bed have an average particle size ranging from about three-sixteenths inch to about one-half inch.

5. The method of claim 4, wherein the thickness of the floating filter bed ranges from about 8 inches to about 12 inches.

References Cited

UNITED STATES PATENTS 3,281,238   10/1966   Bachowski, et al. _ _ 210—69 X

J. L. DeCESARE, Primary Examiner

U.S. Cl. X.R.

210—62, 69, 220, 311